United States Patent [19]

Desmarais et al.

[11] Patent Number: 4,607,442
[45] Date of Patent: Aug. 26, 1986

[54] SLIDE MOUNT

[75] Inventors: Gérard Desmarais, Mont-Royal; Claude Desmarais, Ville Mont Royal, both of Canada

[73] Assignee: Desmarais & Frere Ltd, Longueuil, Canada

[21] Appl. No.: 765,441

[22] Filed: Aug. 14, 1985

[30] Foreign Application Priority Data

Aug. 17, 1984 [CA] Canada ................................. 461261

[51] Int. Cl.⁴ ........................ A47G 1/06; G09F 1/12
[52] U.S. Cl. .................................. 40/152; 40/158 R; 40/159
[58] Field of Search .................. 40/152, 158 R, 159, 40/154, 155, 10 R

[56] References Cited

U.S. PATENT DOCUMENTS

| 654,147 | 7/1900 | Friedlander | 282/22 R |
|---|---|---|---|
| 1,381,674 | 6/1921 | Simpson | 40/158 B |
| 2,164,655 | 7/1939 | Kleerup | 88/26 |
| 2,227,986 | 1/1941 | Tucker | 40/154 |
| 2,390,053 | 12/1945 | Bradford | 88/26 |
| 2,527,765 | 10/1950 | Roehrl | 40/158 R |
| 2,532,776 | 12/1950 | Linser | 40/152 |
| 2,535,265 | 12/1950 | Caffrey | 40/152 |
| 2,823,478 | 2/1958 | Ö Stergaard et al. | 40/156 |
| 3,035,364 | 5/1962 | Hougesteger | 40/152 |
| 3,341,960 | 9/1967 | Florjancic et al. | 40/152 |
| 3,470,643 | 10/1969 | Koeppe et al. | 40/152 |
| 3,477,160 | 11/1969 | Clark | 40/152 |
| 3,478,456 | 11/1969 | Mundt et al. | 40/152 |
| 3,745,679 | 7/1973 | Petrie | 40/107 |
| 3,878,632 | 4/1975 | Berggren et al. | 40/152 |
| 4,189,858 | 2/1980 | De Bruin | 40/158 |
| 4,451,998 | 6/1984 | Philip | 40/152 |
| 4,461,105 | 7/1984 | Thebault | 40/152 |
| 4,467,541 | 8/1984 | Pettersson | 40/154 |

FOREIGN PATENT DOCUMENTS

| 369635 | 11/1937 | Canada | 40/152 |
|---|---|---|---|
| 373349 | 4/1938 | Canada | 40/152 |
| 392748 | 11/1940 | Canada | 40/152 |
| 795517 | 10/1968 | Canada | 40/152 |
| 857632 | 12/1970 | Canada | 101/39 |
| 906277 | 8/1972 | Canada | 88/89.5 |
| 912816 | 10/1972 | Canada | 35/2 |
| 1068951 | 1/1980 | Canada | 88/89.5 |
| 1838499 | 9/1961 | Fed. Rep. of Germany | 40/152 |
| 1109408 | 1/1962 | Fed. Rep. of Germany | 40/152 |
| 1812462 | 6/1966 | Fed. Rep. of Germany | 40/152 |
| 1214898 | 11/1966 | Fed. Rep. of Germany | 40/152 |
| 1269820 | 3/1969 | Fed. Rep. of Germany | 40/152 |
| 1162510 | 4/1958 | France | 17/3 |
| 1311727 | 10/1962 | France | |

Primary Examiner—Gene Mancene
Assistant Examiner—J. Hakomaki
Attorney, Agent, or Firm—Robic, Robic & Associates

[57] ABSTRACT

An improved slide mount of the type comprising a flat rectangular pocket forming a slideway for receiving a standard slide film provided with two lateral rows of driving notches, a central window formed in the pocket and a deformable slot in communication with the slideway to allow the introduction of the slide film with its rows of notches perpendicular to the slot into the slideway. This slide mount is improved in that at least one sprocket is provided for inside the slideway so as to engage one of the notches of the film and lock the same inside the slideway. This sprocket is smaller in size than the notch it engages to let the film free to expand to a certain extent when subjected to the heat of a lamp.

8 Claims, 6 Drawing Figures

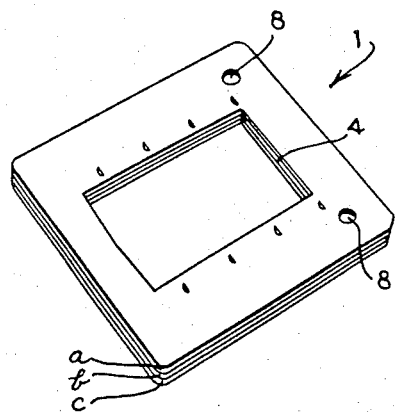
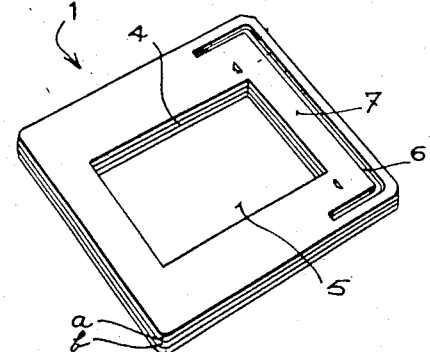
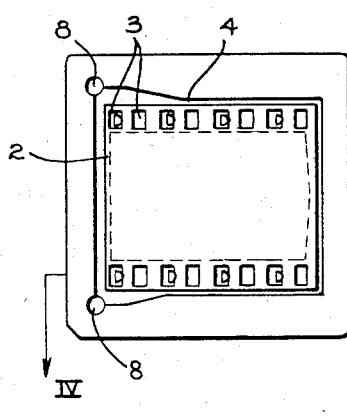
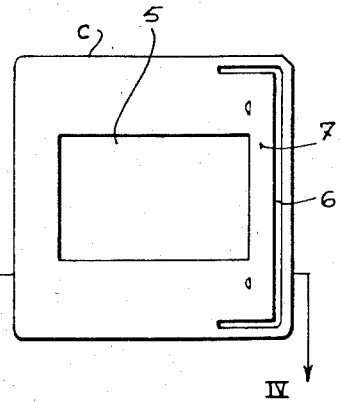
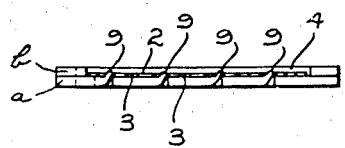

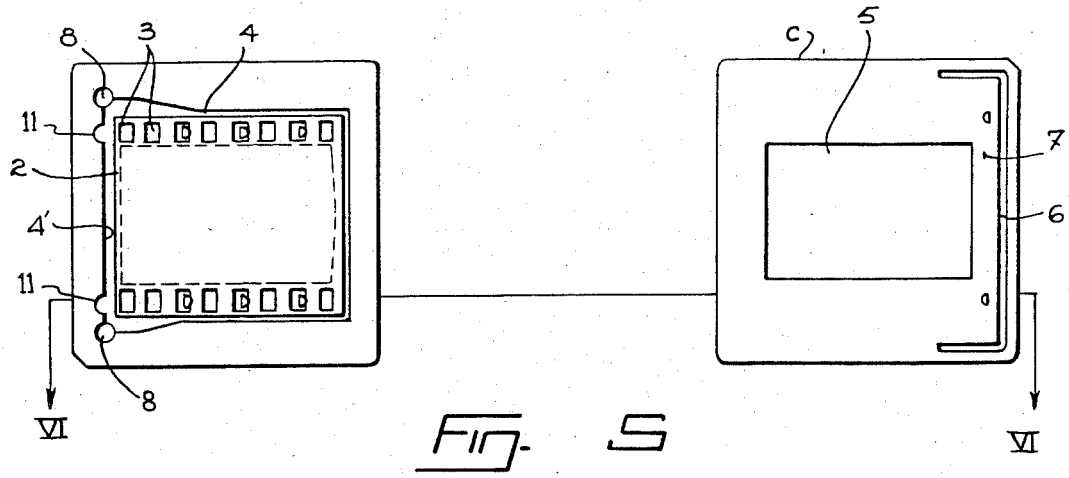
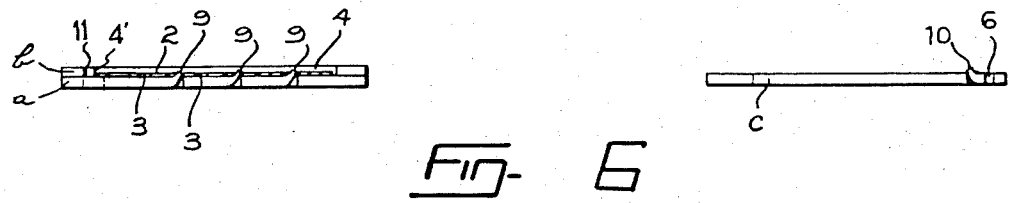

SLIDE MOUNT

BACKGROUND OF THE INVENTION 1. (a) Field of the Invention

The invention relates to an improved slide mount preventing a film portion contained therein to slip out during either processing or handling of said mount.

2. (b) Brief Description of the Prior Art

Most of the processing companies are using slide mounts of the type comprising a flat rectangular pocket forming a slideway for receiving a standard film portion containing one exposure edged by two lateral rows of driving notches. Each of these slide mounts is provided with a central window formed in the pocket and with a deformable slot in communication with the slideway to allow introduction of the slide film portion into the slideway with its row of notches perpendicular to the slot.

In some cases, the slide mount may further be provided with means intended to cooperate with a device for enlarging the deformable slot and thus facilitating the introduction of the slide film portion inside the pocket.

If these mounts are generally satisfactory, they are rarely provided with proper means inside their pocket to prevent the film from slipping out of the mount during the processing steps or the subsequent handling of said mounts. Limiting cams have been suggested to prevent such a slipping but have proved not to be really efficient.

SUMMARY OF THE INVENTION

The object of the present invention is to provide an improved slide mount which overcomes the above mentioned drawback and allows processing and handling of slide films, namely 35 mm slide films, and handling of the resulting slides, with less risk of damage to the film and less annoyance to the slide manipulators.

The improved slide mount according to the invention is of the type comprising a flat rectangular pocket forming a slideway for receiving a standard slide film portion provided with two lateral rows of driving notches, a central window formed in the pocket and a deformable slot in communication with the slideway to allow introduction of the slide film portion into the slideway with the rows of notches of the film perpendicular to the slot. In accordance with the invention, this type of slide mount is improved in that at least one sprocket is provided for inside the slideway so as to engage one notch of the film and thus lock the same inside the slideway. The sprocket is designed to be smaller in size than the notch it intends to engage to let the film free to expand to a certain extent when subjected to the heat of a lamp.

Preferably, two rows of sprockets are provided for inside the slideway to simultaneously engage both rows of notches of the film. The sprockets of one row are spaced apart to engage a corresponding number of notches of the corresponding row of notches.

Preferably, each sprocket has a wedge-shaped structure oriented so as not to interfere with the introduction of the film into the slideway. Advantageously, each sprocket has a height smaller than the thickness of the slideway.

Optionally, the slide mount may further comprise at least one sprocket positioned either in the slideway or in a corresponding recess communicating with said slideway, near the slot, said sprocket being intended to engage the cut edge of the film to additionally prevent it from slipping out of the mount.

The above mentioned sprockets are preferably punched in one surface of the pocket along the longitudinal sides of the central window. When the slide mounts are made of sheets of plastic material folded one above the other, the sprockets may be punched in the sheets before they are joined.

BRIEF DESCRIPTION OF THE DRAWINGS

The invention will be better understood with reference to the following non-restrictive description of preferred embodiments thereof, taken in connection with the accompanying drawings in which:

FIG. 1 is a recto perspective view of a three layered slide mount according to the invention;

FIG. 2 is a verso perspective view of the slide mount of FIG. 1;

FIG. 3 is a top plan view of the slide mount of FIG. 2 with the layer defining the verso face removed from the others and turned over;

FIG. 4 is a side elevational, cross-sectional view according to line IV—IV of the slide mount of FIG. 3;

FIG. 5 is a top plan view of a variant of the slide mount of FIG. 2 with the layer defining the verso face removed from the others and turned over; and FIG. 6 is a side elevational, cross-sectional view according to VI—VI of the variant of FIG. 5.

The improved slide mount 1 according to the invention as shown in the accompanying drawings, comprises three sheets a, b and c of pre-cut plastic sheets. These sheets are joined together to form a layered, sandwich-type assembly using any appropriate means such as gluing, welding, etc.

The slide mount assembly formed by these sheets defines a flat rectangular pocket 4 forming a slideway for receiving a film portion 2 (see FIGS. 3 and 5). The pocket 4 is provided with a central window 5 and with a deformable slot 6 in communication with the slideway. The slide mount 1 also comprises a tongue 7 having a free end defining one of the edges of the slot 6. Two bores 8 may be provided opposite to the tongue for use in opening the slot whenever necessary.

In accordance with the invention shown in FIGS. 1 to 4, the slide mount 1 further comprises two rows of four wedge-shaped sprockets 9, and two additional wedge-shaped sprockets 10.

Also, in accordance with a preferred variant of the invention shown in FIGS. 5 and 6, the slide mount 1 comprises two rows of three wedge-shaped sprockets 9 and two additional wedge-shaped sprockets 10. Each sprocket 10 is positioned in a corresponding recess 11 communicating with the pocket 4, said sprocket 10 having its end flush with the side 4' of the pocket 4.

As shown in FIG. 4 and 6, the sprockets 9 have a smaller height than the thickness of the slideway defined in the pocket 4 and their summit edges are directed toward the bottom of the pocket, so as not to interfere with the notches 3 of the film 2 when the latter enters the pocket 4 and moves toward the bottom of said pocket 4. The height of the sprocket must however have such a height as to positively engage the notches 3 to lock the film inside the pocket 4 when this film 2 is moved through the slot 6, to prevent this film from slipping out of the mount 1.

Advantageously, the sprockets 9 have a smaller surface area than their corresponding notches 3 to let the film 2 free to naturally expand when subjected to the heat of a lamp, especially the lamp of a slide projector.

The sprockets 10 that are similar to the sprockets 9, are provided for positively engaging the cut-edge of the film 2 to additionally lock the film 2 inside the pocket 4.

The sprockets 9 and 10 are respectively punched out of the recto and verso faces of the mount 1, that is in the sheets a and c of the mount 1, before these sheets are joined to form the pocket of the slide mount 1. Punching can be carried out in any conventional manner.

The recess 11 are punched in the sheet b of the mount 1 simultaneously with an opening that is intended to define, when sandwiched between sheets a and c, the pocket 4.

The bores 8 are punched in the sheet a of the mount 1, perpendicular to the slideway. Each of these bores faces the lower face of the tongue 7. Such a positioning of bores 8 allows, when corresponding punches engage them and contact the lower face of the tongue 7, to bend said tongue outwardly and thus "open" the slot 6.

To insert a standard slide film 2 inside the slide mount 1, a device (not shown) comprising punches and means for driving the film portion 2 inside the pocket 4 is used. The device grasps each mount 1, one after the other, engages its punches through the bores 8 to open the slot 6 and drives a portion of film 2 inside the pocket 4 through the opened slot 6 with the driving rows of notches of the film perpendicular to the slot 6. Then, the punches are removed from the bores 8 to allow the slot 6 to return to its original position. When the film portion 2 is inserted inside the pocket 4 and the slot 6 has returned to its original position, the film 2 cannot slip out of the mount 1 because of the sprockets 9 that are oriented to positively engage the notches 3 of the film.

What is claimed is:

1. In a slide mount of the type comprising a flat rectangular pocket forming a slideway for receiving a standard slide film provided with two lateral rows of driving notches, a central window formed in said pocket and a deformable slot in communication with the slideway to allow introduction of the slide film into said slideway with the rows of notches of the film perpendicular to the slot, the improvement wherein at least one sprocket is provided for inside the slideway to engage one of the notches of the film to lock the same inside the slideway after introduction, said sprocket being smaller in size than the notch to let the film free to expand to a certain extent when subjected to the heat of a lamp.

2. The improved slide mount of claim 1, wherein two rows of sprockets are provided for inside the slideway, the sprockets of one row being spaced apart to engage a corresponding number of notches of one of the row of notches of the film.

3. The improved slide mount of claim 2, wherein each sprocket has a wedge-shaped structure oriented so as not to interfere with the introduction of the film into the slideway.

4. The improved slide mount of claim 3, wherein the sprockets are punched in one of the pocket's surface along the sides of the central window.

5. The improved slide mount of claim 4, wherein each sprocket has a height smaller than the thickness of the slideway.

6. The improved slide mount of claim 4, wherein at least one sprocket is positioned in the slideway near the slot in order to engage the cut edge of the film and thus additionally prevent it from slipping out from the slideway.

7. The improved slide mount of claim 4, wherein at least one sprocket is positioned near the slot, in a corresponding recess that communicate with the pocket forming the slideway, in order to engage the cut edge of the film and thus additionally prevent it from slipping out from the slideway.

8. The improved slide mount of claim 7, wherein each sprocket has its end aligned with the corresponding side of the pocket forming the slideway.

* * * * *